United States Patent
Jansen et al.

(10) Patent No.: US 11,353,549 B2
(45) Date of Patent: Jun. 7, 2022

(54) RADAR INTERFERENCE DETECTION

(71) Applicant: NXP B.V., Eindhoven (NL)

(72) Inventors: Feike Jansen, Eindhoven (NL); Francesco Laghezza, Eindhoven (NL)

(73) Assignee: NXP B.V., Eindhoven (NL)

( * ) Notice: Subject to any disclaimer, the term of this patent is extended or adjusted under 35 U.S.C. 154(b) by 417 days.

(21) Appl. No.: 16/412,693

(22) Filed: May 15, 2019

(65) Prior Publication Data

US 2020/0072941 A1    Mar. 5, 2020

(30) Foreign Application Priority Data

Sep. 5, 2018 (EP) ..................................... 18192823

(51) Int. Cl.
*G01S 7/35* (2006.01)
*G01S 7/02* (2006.01)
(Continued)

(52) U.S. Cl.
CPC .............. *G01S 7/354* (2013.01); *G01S 7/023* (2013.01); *G01S 7/36* (2013.01); *G01S 13/345* (2013.01); *G01S 7/356* (2021.05)

(58) Field of Classification Search
CPC .......... G01S 7/36; G01S 7/023; G01S 13/345; G01S 7/356
(Continued)

(56) References Cited

U.S. PATENT DOCUMENTS 4,525,870 A * 6/1985 Fukuhara ............... H03G 3/345
                                                          455/219
5,894,126 A * 4/1999 Pompei .................... G01J 5/14
                                                          250/338.1
(Continued)

FOREIGN PATENT DOCUMENTS

EP    3173812 A1 *  5/2017  .......... G01S 13/343
EP    3173812 A1     5/2017
(Continued)

OTHER PUBLICATIONS

Bechter et al., "Estimation and Cancellation of Interferences in Automotive Radar Signals," the 18th International Radar Symposium IRS 2017, Jun. 28-30, 2017, 10 pages.
(Continued)

*Primary Examiner* — Peter M Bythrow
*Assistant Examiner* — Nuzhat Pervin

(57) ABSTRACT

A data processing device and method for detecting interference in a FMCW radar system are described. For each of a plurality of transmitted chirps of the radar system, a high pass filter is applied to a receiver signal of a receiver channel of a radar receiver during an acquisition time corresponding to a transmitted chirp to remove those parts of the receiver signal corresponding to a reflected chirp having a power at the radar receiver greater than the noise power of the radar receiver of the radar system. The receiver signal power is calculated from the high pass filtered receiver signal. The receiver signal power is compared with a threshold noise power based on an estimate of the thermal noise of the radar receiver to determine whether the receiver signal corresponds to an interfered received chirp including interference or a non-interfered received chirp not including interference.

20 Claims, 11 Drawing Sheets

(51) Int. Cl.
*G01S 7/36* (2006.01)
*G01S 13/34* (2006.01)

(58) Field of Classification Search
USPC .......................................................... 342/196
See application file for complete search history.

(56) References Cited

U.S. PATENT DOCUMENTS

| | | | | |
|---|---|---|---|---|
| 8,334,800 | B2* | 12/2012 | Hayase | G01S 13/931 |
| | | | | 342/70 |
| 9,702,960 | B2* | 7/2017 | Broad | G01S 5/12 |
| 9,971,028 | B2* | 5/2018 | Park | G01S 13/931 |
| 10,101,438 | B2* | 10/2018 | Subburaj | G01S 13/343 |
| 10,830,867 | B2* | 11/2020 | Lin | G01S 13/86 |
| 10,955,547 | B2* | 3/2021 | Ray | G01S 13/24 |
| 2006/0007423 | A1* | 1/2006 | Guruprasad | G01S 7/4021 |
| | | | | 356/5.09 |
| 2006/0181448 | A1* | 8/2006 | Natsume | G01S 7/023 |
| | | | | 342/70 |
| 2007/0280507 | A1* | 12/2007 | Murali | G06T 7/269 |
| | | | | 382/107 |
| 2008/0094274 | A1* | 4/2008 | Nakanishi | G01S 13/931 |
| | | | | 342/91 |
| 2009/0096661 | A1* | 4/2009 | Sakamoto | G01S 13/345 |
| | | | | 342/92 |
| 2012/0249363 | A1* | 10/2012 | Kolinko | H01Q 19/175 |
| | | | | 342/179 |
| 2013/0021196 | A1* | 1/2013 | Himmelstoss | G01S 13/34 |
| | | | | 342/159 |
| 2015/0226848 | A1* | 8/2015 | Park | G01S 7/354 |
| | | | | 342/70 |
| 2016/0285611 | A1* | 9/2016 | Fischer | H04W 16/14 |
| 2016/0291130 | A1* | 10/2016 | Ginsburg | G01S 7/023 |
| 2017/0307728 | A1* | 10/2017 | Eshraghi | G01S 13/87 |
| 2017/0307729 | A1* | 10/2017 | Eshraghi | G01S 7/0232 |
| 2017/0363715 | A1* | 12/2017 | Li | G01S 7/024 |
| 2018/0031675 | A1* | 2/2018 | Eshraghi | G01S 7/354 |
| 2018/0074168 | A1* | 3/2018 | Subburaj | G01S 7/414 |
| 2018/0329027 | A1* | 11/2018 | Eshraghi | G01S 7/0232 |
| 2019/0011533 | A1* | 1/2019 | Ginsburg | G01S 13/931 |
| 2019/0056476 | A1* | 2/2019 | Lin | G01S 7/021 |
| 2019/0103663 | A1* | 4/2019 | Ichinose | H01Q 13/10 |
| 2019/0187246 | A1* | 6/2019 | Behrens | G01S 13/931 |
| 2019/0317187 | A1* | 10/2019 | Meissner | G01S 7/354 |
| 2019/0361113 | A1* | 11/2019 | Ray | G01S 7/003 |
| 2020/0025871 | A1* | 1/2020 | Subburaj | G01S 7/292 |
| 2020/0033442 | A1* | 1/2020 | Gulati | G01S 7/023 |
| 2020/0185804 | A1* | 6/2020 | Watanabe | H01P 3/08 |
| 2021/0190907 | A1* | 6/2021 | Sahara | G01S 13/584 |

FOREIGN PATENT DOCUMENTS

| | | | |
|---|---|---|---|
| EP | 3244229 A1 * | 11/2017 | .......... G01S 13/931 |
| EP | 3244229 A1 | 11/2017 | |

OTHER PUBLICATIONS

Stove, A.G., "Linear FMCW Radar Techniques," IEE Proceedings-F, vol. 139, No. 5, Oct. 1992, 8 pages.

* cited by examiner

RADAR INTERFERENCE DETECTION

FIELD OF THE INVENTION

The present specification relates to radar and in particular to detecting interference in frequency modulated continuous wave (FMCW) radar systems.

BACKGROUND

A variety of different radar techniques are known generally and radar can be used in a wide variety of applications. One particular application of radar systems is to vehicles and in particular in relation to vehicle safety systems and/or autonomous vehicles.

As the number of vehicles equipped with radar systems is increasing and likely to proliferate further, a particular challenge for radar systems in the automotive area is the potential for radar-to-radar interference. Frequency modulated continuous wave (FMCW) radar systems are commonly used in automotive radar systems as the frequency modulation waveform (also called a chirp) is particularly suitable waveform for automotive radar systems owing to its accuracy and robustness. Implementations in which a sequence of short duration frequency chirps are transmitted has favorable properties with respect to the detection of objects moving with a non-zero relative radial velocity.

Typically, stretch processing is used to convert radio frequency (RF) information to the intermediate frequency (IF) by using an analog mixer and anti-aliasing filtering (AAF). Multiple fast Fourier transforms (FFT), along fast time, slow time and multiple channels, may be used to extract information about targets' range, velocity and angle of arrival from a phased array or multiple input multiple output (MIMO) radar. Undesired signals from other radar or communications systems that use the frequency spectrum around the instantaneous frequency of the radar while sampling can be seen as interference. The interference will be down converted to the receiver bandwidth and processed in the same way as the desired signal reflected from a target.

Interference scenarios can happen when two radars (victim and interferer) that are in a common visible path (e.g. line of sight (LOS) and/or reflection and/or diffraction) somehow access the medium using similar carrier frequency and bandwidth at the same time, and making use of non-orthogonal waveforms with a perceivable power. FMCW Interference can be created by correlated and uncorrelated FM sources. Correlated FM sources can create false targets while uncorrelated FM sources (which are the more likely case), can cause reduced dynamic range and sensor blindness.

FMCW-to-FMCW interference levels and occurrences can vary from application to application and from radar configuration to radar configuration. For example, medium range radar (MRR) and short range radar (SRR) can suffer more from the interference problem owing to their larger RF excursion, field of view (FOV) and deployment.

When dealing with FMCW interference different options and strategies be considered at the radar system level. Detection of interference should ideally occur as soon as possible and preferable before Range Doppler processing and the occurrence of detected interference, as well as its energy, can be passed to higher radar system layers. Detection and Avoidance involves the detection of the interference and then changing radar operation parameters to try and reduce the interference in the next system cycle. For example the radar operation parameters can be randomly and blindly changed or the radar system can derive a best time and frequency for subsequent measurements. Detection and Mitigation involves the detection of interference and then estimation of some of the interference parameters (e.g. time duration, frequency, etc.) to try and reduce the interferer components in the receive radar signals. Detection, mitigation and avoidance combines aspects of the three preceding strategies. The interference detection process is common to all of these.

Hence, improved interference detection techniques may lead to improved mitigation and/or avoidance mechanisms.

SUMMARY

According to a first aspect of the present disclosure, there is provided a data processing device for detecting interference in frequency modulated continuous wave radar signals received by a radar receiver of a radar system, wherein the data processing device is configured to: apply a high pass filter to a receiver signal of a receiver channel of the radar receiver during an acquisition time corresponding to a transmitted chirp to remove those parts of the receiver signal corresponding to a reflected chirp having a power at the radar receiver greater than the noise power of the radar receiver of the radar system; calculate the receiver signal power from the high pass filtered receiver signal; and compare the receiver signal power with a threshold noise power based on an estimate of the thermal noise of the radar receiver to determine whether the receiver signal corresponds to an interfered received chirp including interference or a non-interfered received chirp not including interference, for each of a plurality of transmitted chirps of the radar system.

In one or more embodiments, the high pass filter may be at least a second order high pass filter.

In one or more embodiments the cut off frequency of the high pass filter may correspond to a distance to a reflecting object beyond which a maximally reflecting object would have a received signal power at the radar receiver below the noise power of the radar receiver.

In one or more embodiments, the data processing device may be further configured to: determine the degree to which the receiver signal power exceeds the threshold noise power for each chirp; and store an intensity data item for each chirp indicating the degree of interference detected.

In one or more embodiments, there may be four categories of intensity data item and the categories may correspond to no interference, moderate interference, high interference and severe interference.

In one or more embodiments, the threshold noise power may be a fixed threshold noise power.

In one or more embodiments, the threshold noise power may be an adaptive threshold noise power.

In one or more embodiments, the threshold noise power may be calculated using a Constant False Alarm Rate technique.

In one or more embodiments, the data processing device may be further configured to identify interfered parts of the receiver signal identified as corresponding to an interfered received chirp.

In one or more embodiments, the data processing device may be further configured to apply a window to the receiver signal to remove those parts of the receiver signal that have been identified as interfered parts of the receiver signal.

In one or more embodiments, the data processing device may be further configured to identify interfered parts of the receiver signal by: comparing samples of the receiver signal to a power threshold to identify interfered samples; and storing a flag for each sample identified as an interfered sample.

In one or more embodiments, the data processing device may be further configured to: pass the flags identifying interfered samples to a further part of the radar system for use to remove interfered samples from samples of the receiver signal corresponding to transmitted chirps in other receiver channels of the radar system.

In one or more embodiments, the data processing device may be further configured to: pass data identifying each chirp determined to be an interfered received chirp to an avoidance and/or mitigation process within the radar system.

According to a second aspect of the present disclosure, there is provided a package including an integrated circuit, wherein the integrated circuit is configured to provide the data processing device of the first aspect.

In one or more embodiments, the package may be a radar sensor module.

According to a third aspect of the present disclosure, there is provided a FMCW radar system including the data processing device of the first aspect or the package of the second aspect.

In one or more embodiments, the FMCW radar system may be an automotive radar system.

According to a fourth aspect of the present disclosure, there is provided a method of detecting interference in an FMCW radar system, comprising, for each of a plurality of transmitted chirps: high pass filtering a receiver signal in a receiver channel of the radar receiver during a data acquisition period corresponding to a transmitted chirp to filter out that part of the receiver signal corresponding to reflected chirps having a power at the radar receiver greater than the noise power of the radar receiver; calculating the receiver signal power of the high pass filtered receiver signal; and comparing the receiver signal power to a threshold noise power based on an estimate of the thermal noise power of the radar receiver to determine whether the receiver signal corresponds to an interfered chirp including interference or a non-interfered chirp not including interference.

Features of the first aspect may also be or give rise to counterpart features for the fourth aspect.

BRIEF DESCRIPTION OF THE DRAWINGS

Embodiments of the invention will now be described in detail, by way of example only, and with reference to the accompanying drawings, in which.

DETAILED DESCRIPTION

Figure 1:
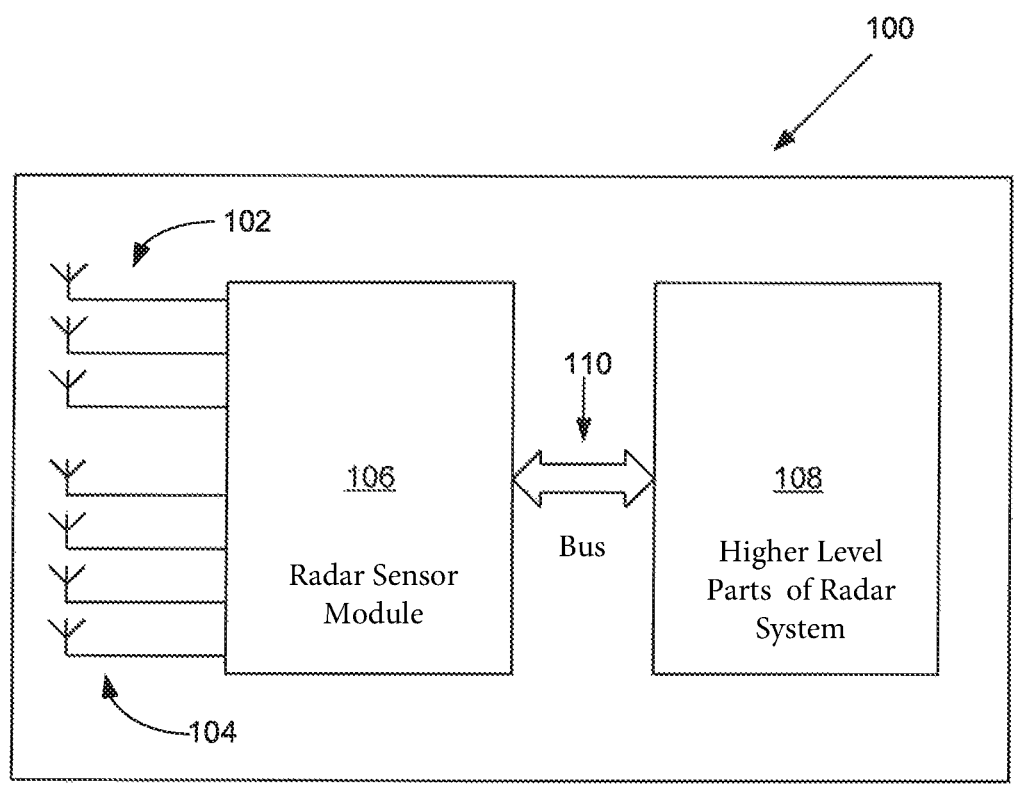
FIG. 1 shows a schematic block diagram of a radar system using the interference detection technique according to the invention.

With reference to FIG. 1 there is shown a schematic block diagram of a radar system 100 in which the interference detection technique may be used. In the described embodiment, the radar system is an automotive radar system, but the technique is not necessarily limited to that application. The radar system 100 includes a plurality of transmitting antennas 102 and a plurality of receiving antennas 104 connected to a radar sensor module 106. The radar sensor module 106 is connected to other higher level parts 108 of the overall radar system 100 by a radar system bus 110. The exact structure of the overall radar system 100 is incidental and the interference detection technique can be used in a wide range of radar systems and is not limited to the specific radar system 100 illustrated in FIG. 1. Also various features of the radar system may be varied as it will be apparent to a person of ordinary skill in the art. For example, the number of transmitting and receiving antennas can be more or fewer and various functions can be distributed differently between the radar sensor module 106 and the remainder of the radar system 108. Also some functionalities may be implemented in dedicated hardware and others in software and others in combinations of hardware and software. In one embodiment, the sensor module 106 may be provided in the form of an integrated circuit in a package.

Figure 2:
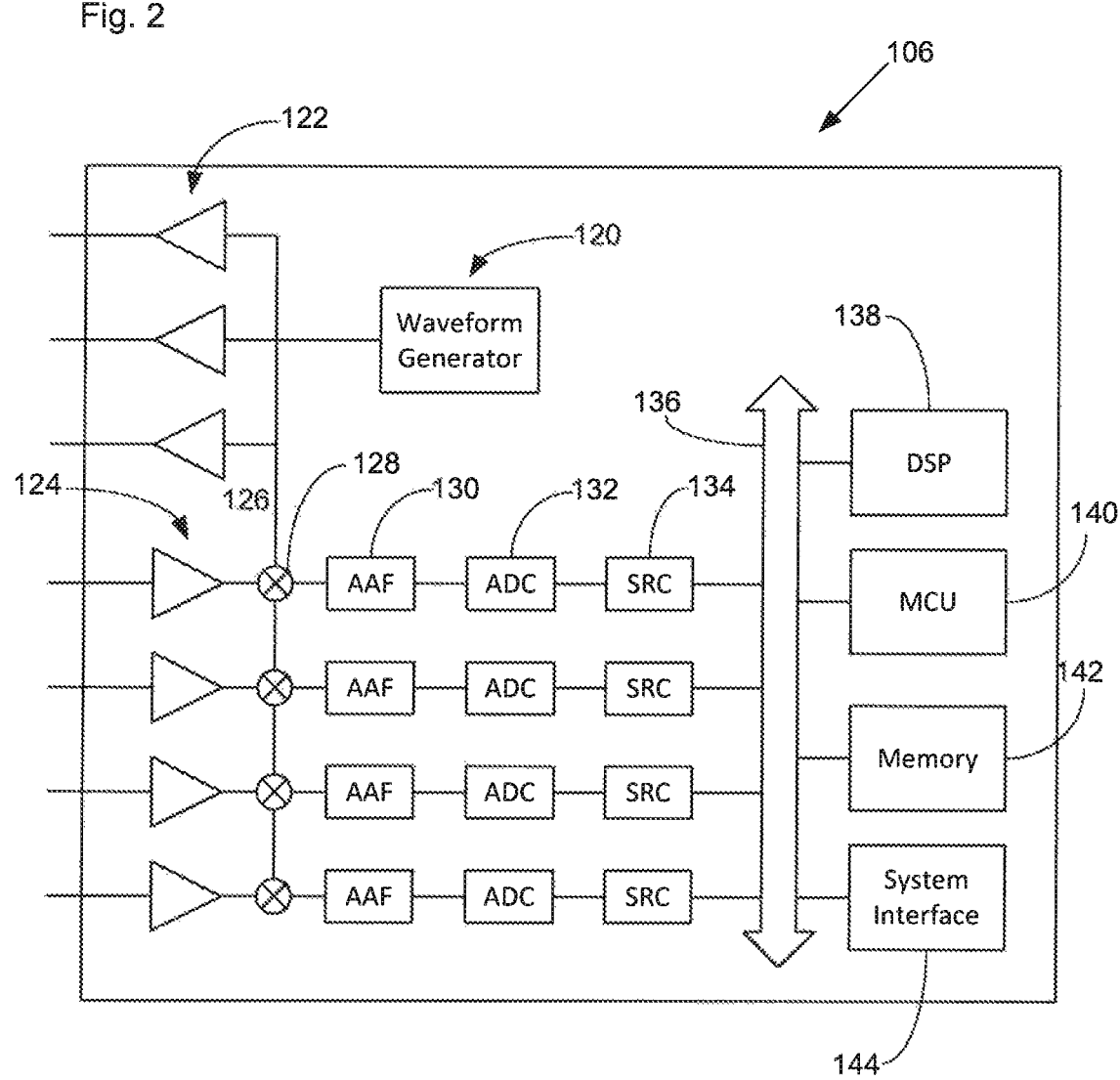
FIG. 2 shows a schematic block diagram of a radar sensor module of the radar system shown in FIG. 1 and implementing the interference detection technique according to the invention.

FIG. 2 shows a schematic block diagram of the radar sensor module 106 of FIG. 1 in greater detail. The radar sensor module includes a waveform generator 120 configured to generate radar cycles each comprising a sequence of multiple chirp signals and having an output connected to respective inputs of a power amplifier 122 for each of three transmitter chains, for example. The respective outputs of the power amplifiers 122 are each connected to a respective one of the transmission antennas 102. Four receiver chains, for example, are also provided a respective one of which is connected to a respective one of the receiver antennas 104. Each receiver chain 124 generally includes a low noise amplifier 126, a mixer 128, to which the output of the waveform generator 120 is also connected, an anti-aliasing filter 130, an analogue to digital converter 132 (having a sampling frequency of $f_{adc}$) and a sample rate conversion device 134. The output of each receiver chain is connected to a bus system 136 to which a digital signal processor (DSP) 138, a microcontroller unit (MCU) 140, a memory 142 and a system interface 144 are each connected. DSP 138 is used to implement various data processing operations as described below, MCU is used to generally control operation of the sensor module 106 and also to carry out various higher level data processing operations, memory 142 provides local data storage for the DSP 138, MCU 140 and sensor module 106 generally and system interface 144 provides an interface to the remainder of the radar system 108 via system bus 110.

The overall method of operation of the FMCW radar system 100 will initially be described with reference to provide context for the description of the interference detection technique. The overall method of operation of FMCW radar systems, without the interference detection technique, is generally understood by a person of ordinary skill in the art and various details will be omitted from the following for the sake of brevity and to avoid obscuring the description of the interference detection technique.

Figure 3:
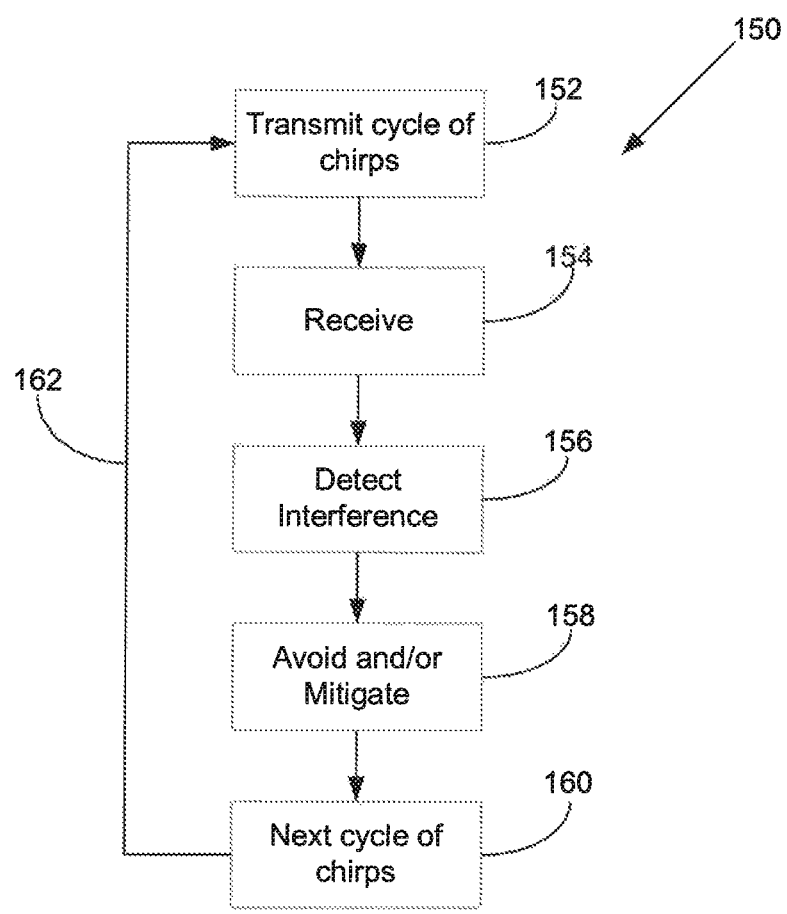
FIG. 3 shows a flow chart illustrating a method of operation of the radar system if FIG. 1.

As illustrated in FIG. 3 the method 150 of operation of the radar system 100 generally involves transmitting 152 a sequence of chirps, e.g. 128 chirps, via transmitting antennas 102 as a first cycle of operation of the radar system.

Figure 4:
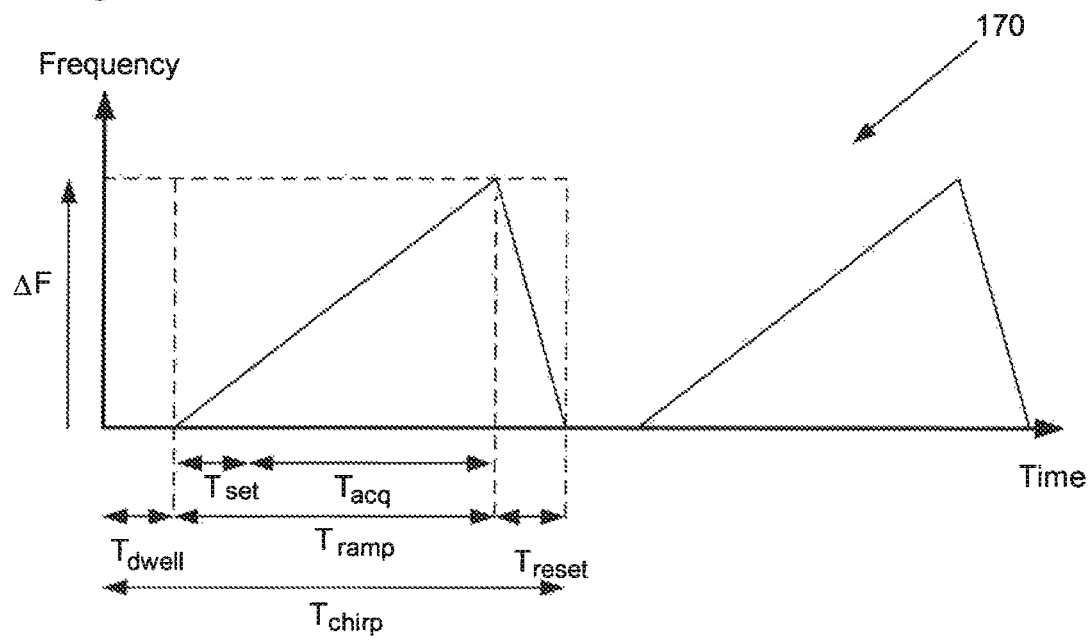
FIG. 4 shows a waveform diagram illustrating a chirp signal used by the radar system.

FIG. 4 shows a plot 170 of signal frequency against time illustrating a first and second chirp signal of a cycle of chirps. As will be appreciated, the chirp signal is effectively a frequency ramp which periodically modulates a sinusoidal carrier wave, at frequency $F_c$, e.g. 79 GHz, with a change in frequency $\Delta F$. The overall chirp signal has a period $T_{chirp}$, which comprises an initial dwell time, $T_{dwell}$. This dwell time is simply a pause between chirps. The dwell time is followed by a linear frequency ramp with duration $T_{ramp}$, followed by a reset time with duration $T_{reset}$. Two other time periods are relevant to operation of the receiver channels. There is a settle time, $T_{set}$, after $T_{dwell}$, and which starts at the start of the ramp signal. The settle time, $T_{set}$, provides a time for a phase locked loop (PLL) used to generate the ramp signal to settle to its linear behaviour. Also, any reflected signals may return to the radar system during the settle time. There is then a data acquisition period, $T_{acq}$, which begins at the end of the settle time and which ends at the end of the frequency ramp. The receiver channels are active to acquire data based on the signals present in the receiver channels during this data acquisition time, $T_{acq}$, as explained in greater detail below.

Although a linearly increasing frequency ramp is shown in FIG. 4, it will be appreciated that the technique is not necessarily limited to such a chirp signal and that other frequency modulation schemes may also be used. After the cycle of chirp signals has started to be transmitted, the receiver channels 124 are activated to start detecting signals picked up by receiver antennas 124 during the time $T_{acq}$. These signals will include noise in the receiver channels and may include reflected chirp signals from targets and/or interference. Hence, at 154, the radar system starts to process signals received on the receiving antennas 104.

Figure 5:
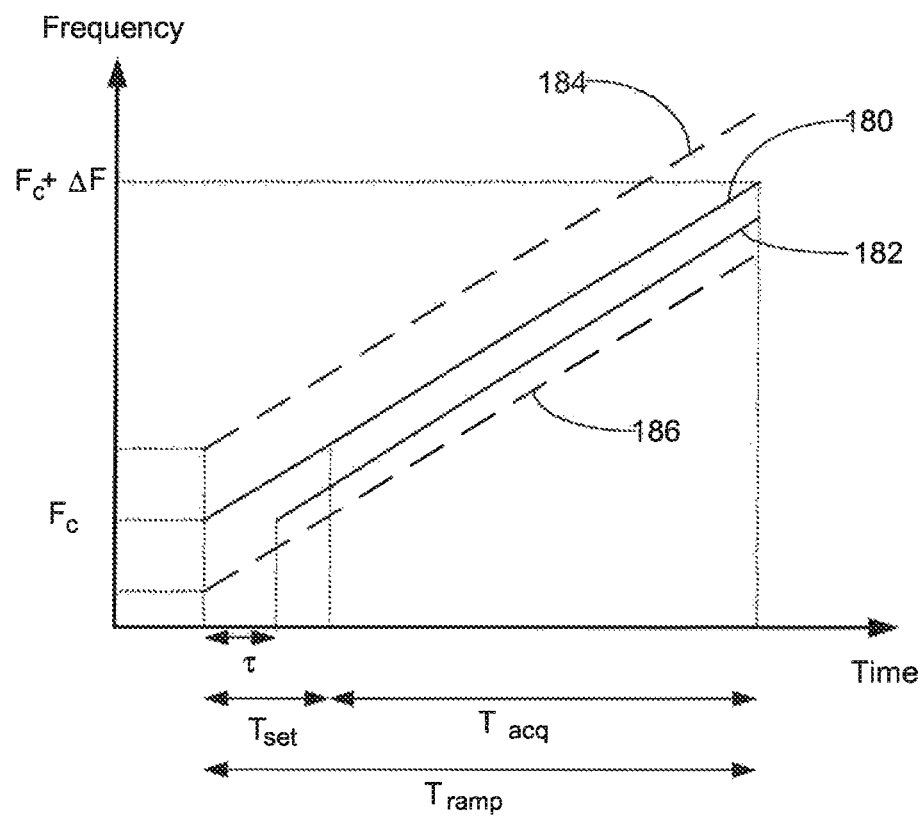
FIG. 5 shows a plot of frequency against time illustrating the general principle of operation of the radar system.

As illustrated in FIG. 5, the transmitted chirp signal 180 starts at the carrier frequency $F_c$ and increases by $\Delta F$ over a time $T_{ramp}$, and that chirp signal may be reflected by an object and be received as a reflected signal 182 delayed by a time, $\tau$, being the time of flight. As can be seen in FIG. 5, the delay, $\tau$, is relatively short and less than $T_{set}$, and so any reflected chirp will have started to be received at the receiver channel by time the data acquisition starts. In the receiver channels, during the data acquisition period, $T_{acq}$, the signal in the receiver channel, after low noise amplification, is down converted by being mixed with the modulating waveform. In the down conversion operation, the transmitted signal is mixed with the signal in the receiver channel and any received chirp signal present is effectively the time delayed transmitted signal in the analog domain. In case the relative velocity between the radar system and the reflecting object is zero the time delayed signal is simply an attenuated and phase rotated version of the transmitted signal. The result of the down conversion operation is a sine wave oscillating at the so called beat frequency. The beat frequency, $F_{beat}$, depends on the distance to the reflecting object D, the difference between the start and the stop frequency of the ramp $\Delta F$, and the duration of the ramp $T_{ramp}$ as follows:

$$F_{beat} = \Delta F / T_{ramp} \times 2D/c$$

where c is the speed of light.

In case the relative velocity is non-zero the corresponding Doppler frequency is added to the beat frequency. If the duration of the chirp is short, e.g. shorter than 100 µs, and the frequency ramp $\Delta F$ is at least several tens of MHz, then the Doppler frequency is very small compared to the beat frequency and can be ignored in the calculation of the distance, D. The Doppler component will, however, change the phase of the received frequency ramp 182. A well-known technique, the two-dimensional Fast Fourier Transformation (FFT), may be used to calculate the relative radial velocity as described in greater detail below. In such FMCW radar systems the relation between the distance, D, and the beat frequency, $F_{beat}$, is linear and the beat frequency increases with increasing distance to the reflecting object.

In practice multiple reflections can be present in the field of view of the radar system. In this case the output of the down conversion operation is a summation of sine waves oscillating at the beat frequencies corresponding to the distances to the reflecting objects. As illustrated in FIG. 5 the anti-aliasing filters 130 in the receiver channels have an upper aliasing low pass filter boundary 184 and a lower aliasing low pass filter boundary 186 as represented by dashed lines in FIG. 5. The anti-aliasing filters 130 have a cut-off frequency at half the sampling rate, $f_{adc}$, of the ADCs 132 in the receiver channels and determine the maximum beat frequency and consequently the maximum detectable range. Furthermore, the anti-aliasing filters also reduce the amount of unwanted noise and interference that can be captured at the IF signal frequency. A sample rate conversion device 134 can be provided in each receiver chain in the event that the sampling frequency of the ADC, $f_{adc}$, is greater than the maximum beat frequency that the system wants to detect, in order to effectively reduce the sampling rate of the ADCs.

Returning to FIG. 3, at 156 interference detection can be carried out on the signals in the receiver channel using a technique described in greater detail below. Depending on the results of the interference detection, the higher level processes of the radar system may carry out appropriate avoidance and/or mitigation strategies as are generally known in the art at 158. For example, various radar operation parameters may be changed to try and reduce the interference in the next system cycle. Additionally or alternatively, some of the interference parameters (e.g. time duration, frequency, etc.) may be estimated to try and reduce the interferer components in the receive radar signals. Then at 160 a next radar cycle occurs and processing returns, as indicated by process flow line 162, back to 152 at which a next sequence of chirps are transmitted, potentially using any modified operating parameters as determined at 158.

As discussed above, the receiver channels process the received signals on the receiver antennas 104, be down conversion, anti-aliasing filtering, analog-to-digital conversion and any sampling rate conversion. The digital samples are then processed by the digital signal processor 138 to estimate the magnitude of the beat frequencies. As mentioned above, a Fast Fourier Transform based approach may be used to estimate the beat frequencies and hence distances.

The frequency at which the samples are taken by the ADCs 132 is $f_{adc}$. According to the sampling theorem the maximum frequency that can be represented by the digital signal is the Nyquist frequency which is equal to half of $f_{adc}$ in case of real valued samples. Reflecting objects at large distance can have beat frequencies exceeding half of fade. Their position in the frequency spectrum is ambiguous: it is the position in the baseband spectrum plus an unknown integer multiple of $f_{adc}$.

In some cases the far-away reflectors are not of interest. To prevent this undesired aliasing the anti-aliasing filters 130 are used. These filters strongly attenuate the frequency components exceeding the Nyquist frequency of $f_{adc}/2$. In FIG. 2 the anti-aliasing filters are realized as a combination of analog and digital filters.

Figure 6:
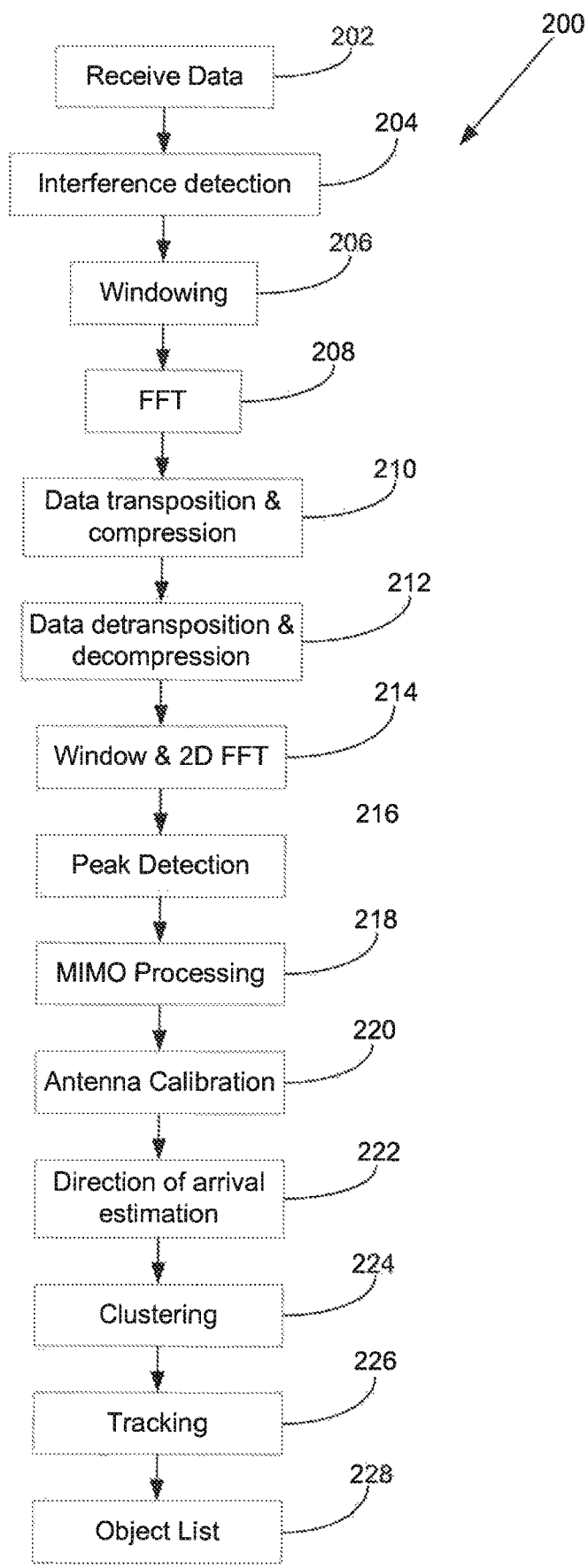
FIG. 6 shows a flow chart illustrating the method of operation of the radar system.

FIG. 6 shows a flow chart 200 illustrating the data processing operations carried out by the DSP and MCU in processing the digital samples and carrying out various higher level radar system operations. At 202 the digital samples of the signals the receiver channels are received by DSP 138. At 204 an interference detection process is applied to the digital samples of the signal from only a one of the receiver channels, as will be explained in greater detail below. Steps 204 to 228 are generally conventional but are applied to the receiver data form the receiver channels if modified based on the results of the detection process 204. Steps 202 to 218 may be carried out by the DSP and steps 220 to 228 may be carried out by the MCU.

At 206, a windowing can be applied to the receiver data, firstly to select a subset of samples from the total samples per chirp, and secondly to shape the frequency spectrum in such a way that the sidelobes are sufficiently small. Chebyshev or Hamming windows may be used, for example. A two dimensional FFT is used to calculate the relative radial velocity of any objects in the field of view. At 208 a first FFT is applied to each received chirp to convert the time signal into the frequency domain. The frequency components for each chirp are effectively a matrix of samples. If the samples were stored in a row-by-row fashion then the samples would be stored at contiguous memory addresses. Then for a second FFT the processor would need to retrieve the sample data with a fixed offset (for example, for all samples corresponding to FFT bin 1 from all chirps). This typically would be time consuming because the samples would need to be transferred one by one over the bus which would be time consuming. Hence, at 210 the matrix of frequency components for each chirp is transposed and all the samples are stored in such a way that upon read a set of samples can be read without offsets. Compression may also be applied to save memory.

Hence, at 212, the data is decompressed and de-transposed so that a second FFT operation may be carried out at 214 over all the samples in a single column to provide the distance/velocity 2D spectrum. At this stage multiple 2D spectra are available, one for each receiving antenna. Optionally, the power values of these spectra may be averaged. At 216 a peak detection process is applied to the power values and may use a Constant False Alarm Rate (CFAR) approach. The threshold for the CFAR approach may be calculated along the Doppler frequency (relative velocity) dimension. Preferably an Ordered Statistics (OS) CFAR algorithm is used. In this algorithm all samples belonging to the Doppler spectrum of the distance being processed are ordered according to their power value after which the Nth biggest sampled is used to calculate the detection threshold. The receiver receives a summation of transmitted signals when multiple transmitters are active at the same time, so at 218 MIMO processing is carried out to separate the received signals based upon time, frequency offsets or codes.

The MCU may then carry out any antenna calibration at 220 and at 222 the direction of arrival is estimated for the samples for which the power exceeds the CFAR threshold. Further processing may optionally be applied in the form of data clustering 224, object tracking 226 (using a Kalman filter) and object listing 228. The results of the radar range processing may then be passed up to higher system levels of the radar system for further action as appropriate.

The interference detection technique carried out at step 204 will now be described in greater detail. As illustrated in FIG. 6, the interference detection technique is applied prior to the first Fourier Transform and therefore is carried out in the time domain rather than the frequency domain. The interference detection technique is applied to receiver signals in a one of the receiver channels. The results of the interference detection technique may then be applied to the receiver signals in all of the receiver channels to improve the radar system performance.

Figure 7:
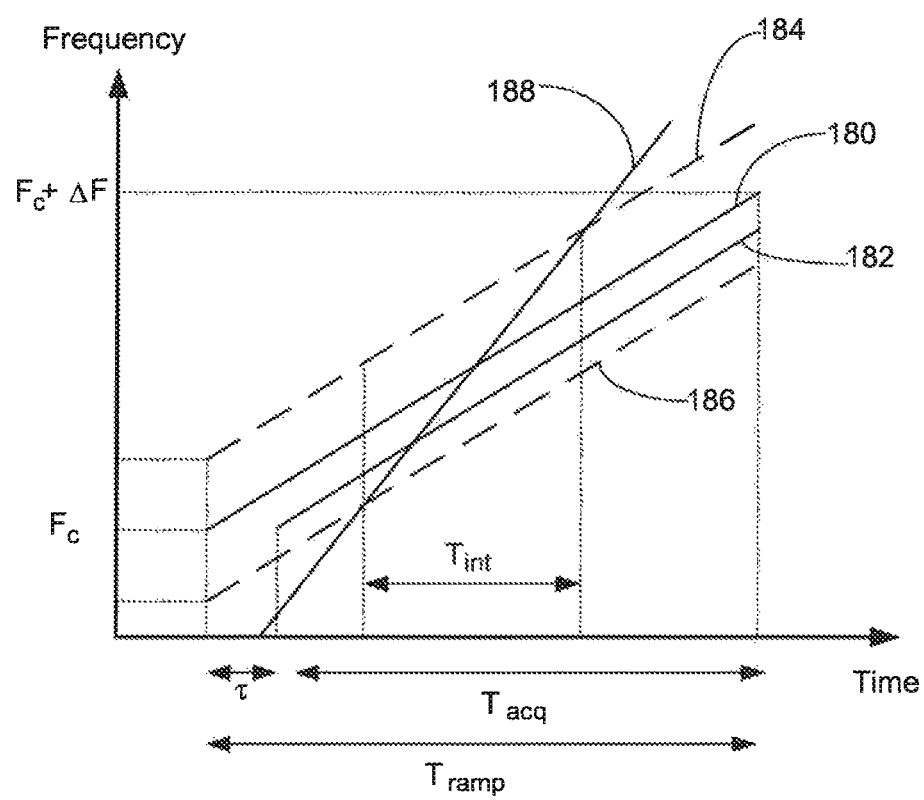
FIG. 7 shows a plot of frequency against time illustrating the effect of an interfering radar system.

FIG. 7 shows a plot of frequency against time similar to that of FIG. 5 and illustrates the effect of an interference. For a transmitted chirp 180, the received time delayed, by time τ, chirp corresponds to line 182. If there is an interfering FMCW radar within the field of view of the radar system, then the transmitted chirp of the interfering radar system may have a frequency ramp as indicated by line 188. Owing to the lower anti-aliasing LPF boundary 186 and the upper anti-aliasing LPF boundary 184, the interfering chirp will be present in the receiver channel for an interference time 189, $T_{int}$. Hence, during the data acquisition period $T_{acq}$, corresponding to and associated with the originally transmitted chirp signal 180, some of the signal in the receiver channel may correspond to a reflected chirp 182 and other parts of the received signal, during time $T_{int}$, may correspond to a mixture of interfering chirp and reflected chirp.

As discussed above, and illustrated in FIG. 2, during the data acquisition time, $T_{acq}$, corresponding to the original transmitted chirp, the receiver signal in a receiver channel is down converted, anti-aliasing filtered, analog to digital converted, any sample rate conversion applied and then the digital data passed to the DSP for processing. Each chirp of a radar cycle is sampled a number of times by the ADC during the data acquisition time, $T_{acq}$, and the sampled digital data corresponding to each transmitted chirp is stored in the DSP 138 for processing.

For the sake of brevity, the following may at times refer to a "received" or "reflected" chirp, but it will be understood that this may simply be short hand for the signal in the receiver channel during the data acquisition period associated with a transmitted chirp, as in some circumstances no reflected chirp signal may be received (e.g. if there are no reflector objects) or the reflected chirp signal may be too weak to be discernible by the receiver (as discussed in greater detail below).

Figure 8:
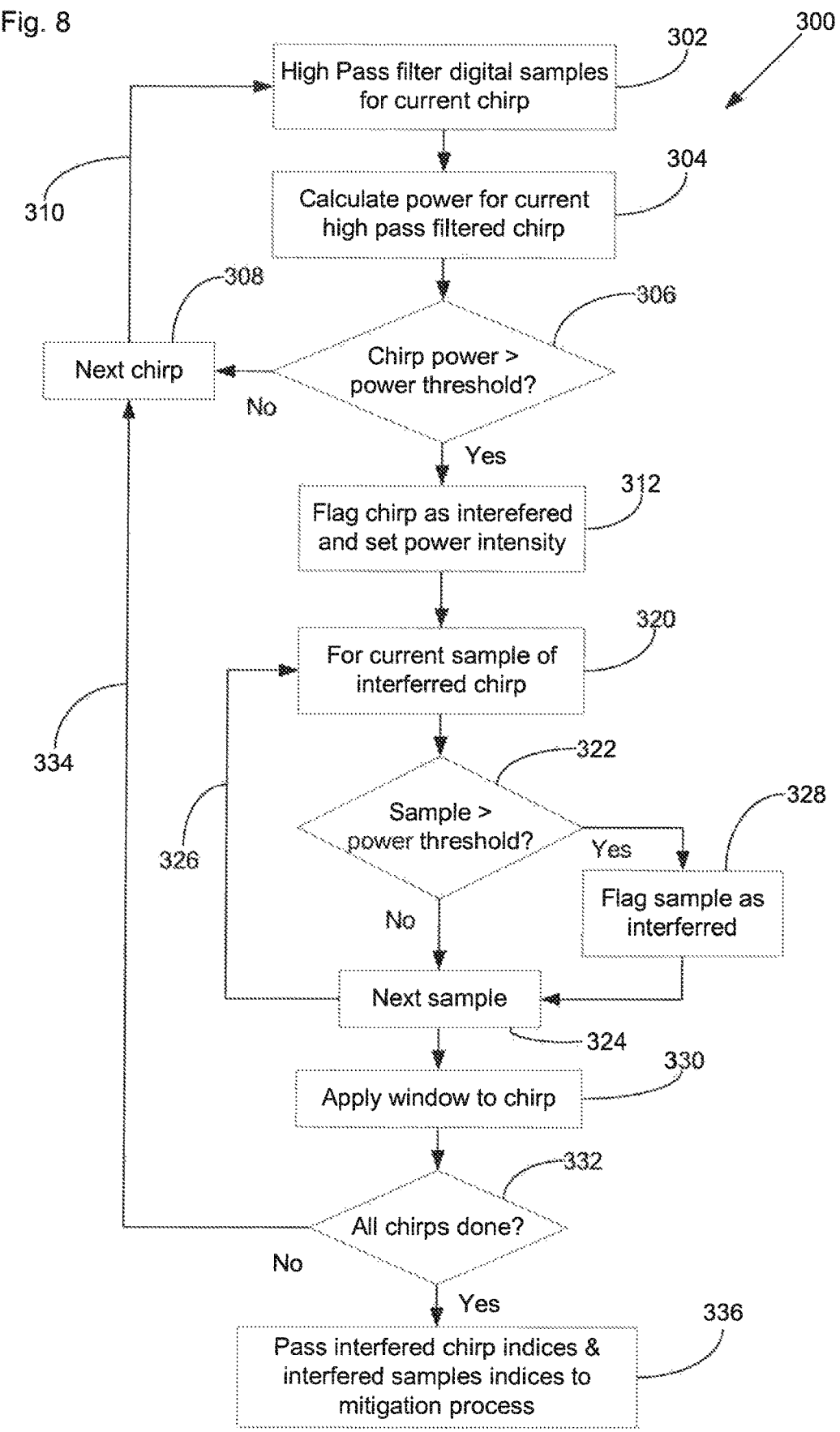
FIG. 8 shows a flow chart illustrating a method of interference detection according to the invention as used in the method illustrated in FIG. 6 and as implemented by the radar sensor module shown in FIG. 2.

FIG. 8 shows a process flow chart illustrating the data processing operations which may be carried out by the DSP during the interference detection process 204 in greater detail. The interference detection method 300 begins at 302 by applying a high pass filter to the digital samples of the receiver signal in the receiver channel during the data acquisition period associated with a current chirp of the current radar cycle on only one of the receiver channels. High pass filtering is applied so as to remove those discernible signals which might have arisen from a reflector and so that the remaining discernible signals are largely entirely likely to be interference and noise.

Figure 9:
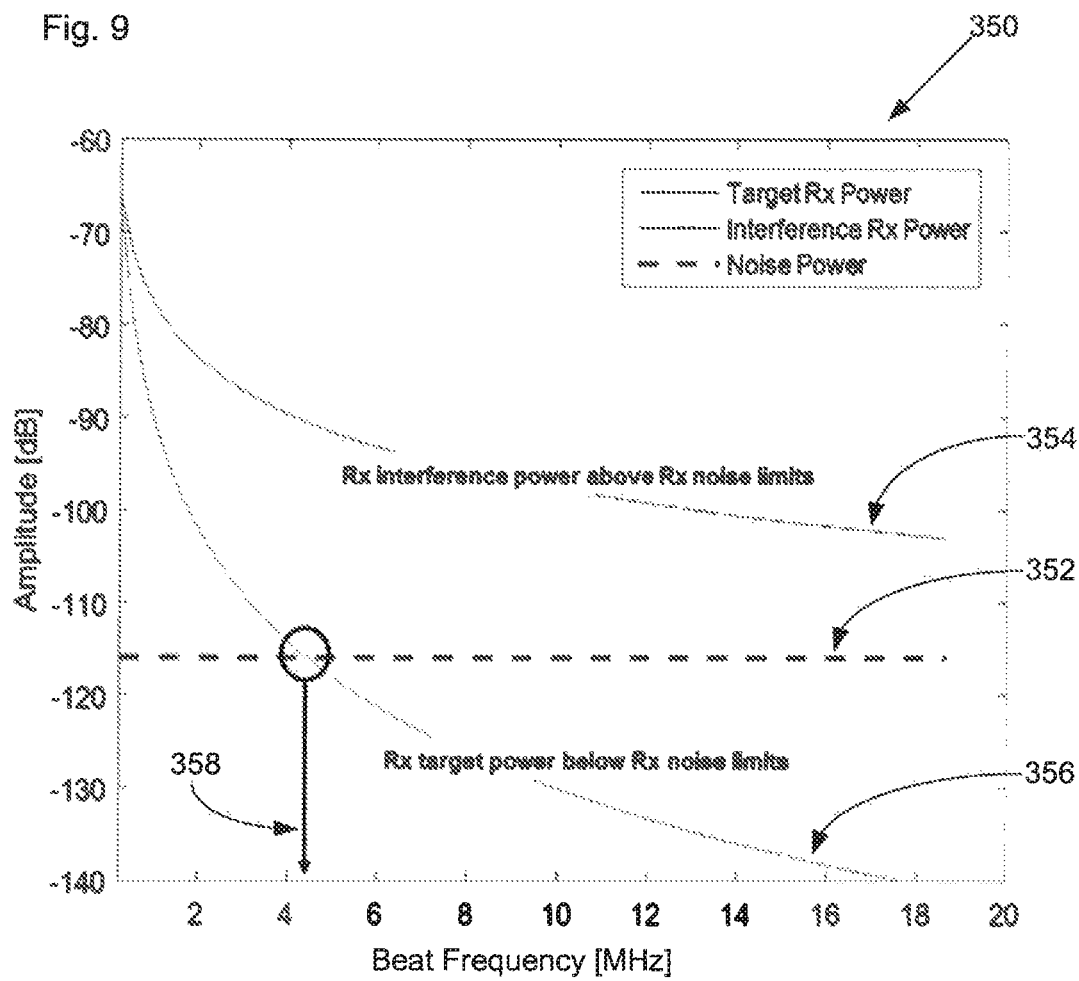
FIG. 9 shows a plot of signal amplitude against beat frequency illustrating the high pass filter used in the interference detection technique.

FIG. 9 shows a plot 350 of received signal amplitude against beat frequency and which is related to the distance to the source of the signal. In FIG. 9, dashed line 352 represents the inherent noise of the radar receiver channel Hence, signals less than the noise cannot be discerned by the receiver. Line 354 represents the received power from an interferer and line 356 represents the received power from a reflecting target object.

As illustrated in FIG. 9, at the radar system, the power received from a target and from a generic interferer follows different rules. The target receiver power attenuation factor is determined by the two-way path ($1/R^4$ law where R is the radar-to-target distance) and by the target properties in terms of radar cross section (RCS). On the other hand, the interferer signal is directly generated from a different radar system. If it is assumed that the interferer is located at the same distance R as a generic target, then the power attenuation factor is determined by the one-way path ($1/R^2$ law) and no target parameters have to be considered for the interference. This power difference can be appreciated in FIG. 9, where the target received power 356 and interference received power 354 are shown as functions of the beat frequency at the receiver. As noted above, the beat frequency on the x-axis can be directly translated to the target distance. Comparing both the received powers with the noise power 352 of the radar system, it can be seen that, after a certain distance (corresponding to the beat frequency of approximately 4.3 MHz indicated by arrow 358 in the figure) no power from a reflecting target can be discerned at the radar receiver. Hence, if a power level greater than the noise level 352 is present, then that signal can only be related to the presence of interference, rather than a reflecting target. Therefore, applying a high pass filter to filter out the power corresponding to close targets (and hence below the beat frequency at 358) can be beneficial in term of interference detection.

Hence, a high pass filter with a cut off-frequency which passes signals having a frequency greater than the frequency at which a reflector cannot be discerned form the receiver noise is used. The 3 dB cut-off frequency, $f_c$, for the high pass filter can be calculated using the following expression:

$$f > \frac{2\Delta F}{cTramp} \sqrt[4]{\frac{P_t G_t G_r \sigma \max \lambda^2}{(4\pi)^3 \sigma_n^2}}$$

where $\Delta F$ is the frequency ramp, c is the speed of light, $T_{ramp}$ is the duration of the frequency ramp, $\sigma_n^2$ is the noise power of the receiver, $P_t$ is the transmitted power, $G_t$ is the transmit antenna gain, $G_r$ is the receive antenna gain, $\lambda$ is the wavelength and $\sigma_{max}$ is the maximum radar cross section.

The noise power of the receiver, $\sigma_n^2$ can be calculated from:

$$10^{\frac{P_{dBm}}{10}} = \sigma_n^2$$

where $P_{dBm}$ is the noise power in dBm defined below.

The filter should be at least second order to be able to provide a sufficiently steep filter characteristic.

Hence, the 3 dB cut-off frequency of the high pass filter is aligned with the distance beyond which a maximally reflecting object has a signal power below the noise level of the receiver. The noise level of the receiver is determined based upon the noise figure of the receiver, the temperature of the receiver and the bandwidth over which the noise power is integrated. Hence, the integrated noise power found by integrating the power per Hz over the used bandwidth B is given by $k_B TB$. This noise power can be expressed in dBm (dB milliwatt) at room temperature and is then given by:

$$P_{dBm} = 10\log10(k_B TB) + 30 =$$
$$10\log10(k_B 300) + 30 + 10\log10(B) = -174 + 10\log10(B)$$

Figure 10:
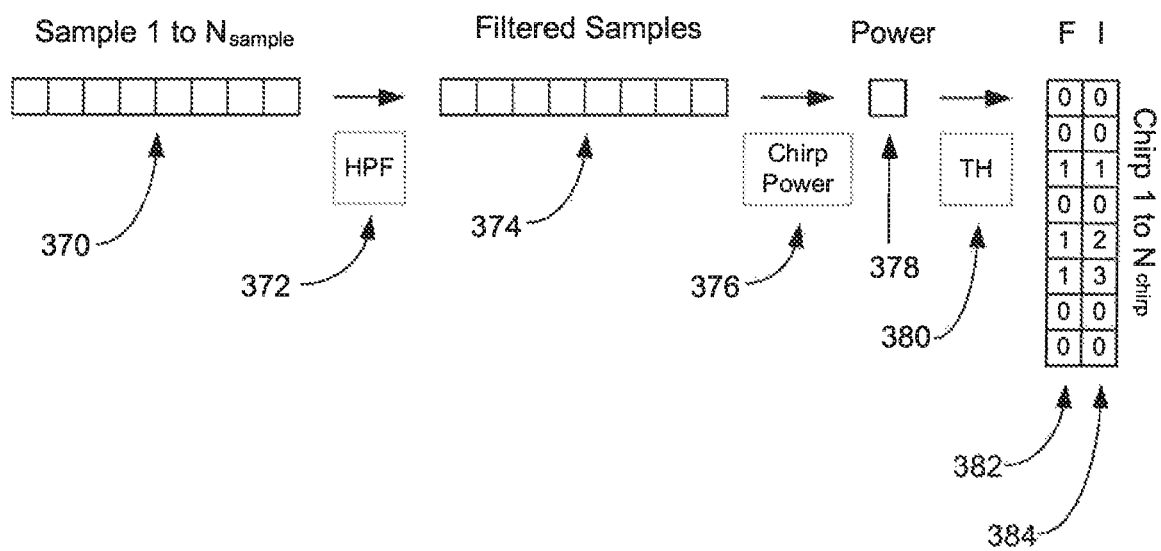
FIG. 10 illustrates various data structures used at various stages of the interference detection technique.

FIG. 10 schematically illustrates data structures which may be used and maintained by the DSP 138 in carrying out the method 300 illustrated in FIG. 8. A first data structure 370 stores the $1^{st}$ to $N_{sample}$ samples for the current chirp, where $N_{sample}$ is the total number of samples of the receiver signal for each transmitted chirp during the acquisition time, $T_{acq}$, of the signal in the receiver chain for the current chirp. For ease of illustration, merely 8 samples are shown in FIG. 10, but in practice the number of samples may be much greater, for example 128, 256, 512, 1024 or similar After high pass filtering at step 302, and represented by block 372, the high pass filtered values of the samples for each sample for the current transmitted chirp are stored in a second data structure 374.

Then, at 304, the power is calculated for the current chirp from the high pass filtered samples for each chirp, as illustrated by block 376. For the current chirp, the power P for the $1^{th}$ chirp can be calculated from the $k^{th}$ high pass filtered sample, $s_{filt}$, of the receiver signal using:

$$P^{(l)} = 10\log_{10}\left(\frac{1}{N_s}\sum_{k=1}^{N_s}|s_{filt}^{(l)}(k)|^2\right)$$

and where $N_s$ is the total number of samples within $T_{acq}$. The value for the power of the receiver signal for the current chirp calculated from the filtered samples is then stored in a third data structure 378.

Then at 306 the calculated power for the receiver signal for the current chirp is compared with a threshold power value. The threshold power value may be a fixed power threshold or a variable power threshold. The fixed power threshold may be calculated as 3 dB greater than the receiver noise power using the same approach as described above. So at 306, the power value for receiver signal for the current chirp is compared to the power threshold. If the power value for the receiver signal for the current chirp does not exceed the power threshold, then the received chirp is not flagged as being an interfered chirp and a next chirp is selected at 308 and processing loops for the receiver signals associated with the next chirp of the current radar cycle as indicated by process flow return line 310.

In FIG. 10, the power thresholding is represented by block 380. A further FLAG data structure 382 may be used to store a flag data item, for each of chirps of the radar cycle, 1 to $N_{chirp}$, and which indicates if the chirp has been identified as including interference, i.e. FLAG=1, or not, i.e. FLAG=0. Hence, as illustrated in FIG. 10, the $1^{st}$, $2^{nd}$, $4^{th}$, $7^{th}$ and $8^{th}$ chirps have not been flagged as being interfered and the $3^{rd}$, $5^{th}$ and $6^{th}$ chirps have been flagged as being interfered.

A yet further INTENSITY data structure 384 may be used to store an intensity data item for each chirp and which indicates the degree of interference of the chirp. For example, for chirps not flagged as having interference, the INTENSITY data item is set to zero.

If at 306 it is determined that the power for a chirp does exceed the threshold at 306, then at 312 the chirp is flagged as being interfered by setting the value of FLAG for the current chirp index to 1, and the amount by which the chirp power exceeds the threshold is determined and a corresponding intensity data item is written to the intensity data structure 384. For example, if the chirp power exceeds the threshold by between 0 to 3 dB, then this may correspond to a moderate intensity of interference and a value of 1 may be written to the intensity data structure 384 at 312. If the chirp power exceeds the threshold by between 4 to 7 dB, then this may correspond to a high intensity of interference and a value of 2 may be written to the intensity data structure 384 at 312. If the chirp power exceeds the threshold by more than 8 dB, then this may correspond to a severe intensity of interference and a value of 3 may be written to the intensity data structure 384 at 312. Hence, by comparing the chirp power with the threshold power, a chirp is flagged as including interference or not, and the intensity of any interference is determined and stored for each chirp.

Instead of using a fixed power threshold at 306 a variable power threshold may be used for each chirp. An approach based upon Constant False Alarm Rate (CFAR) principles may be used, and in particular an Order Statistic (OS-CAFR) approach, at a step between 304 and 306 in FIG. 8 (not illustrated) at which the power threshold for the current chirps is calculated. The power for each of the high pass filtered samples for the chirp has been calculated at 304 from the high pass filtered samples, and then the high pass filtered samples are ordered according to their individual power from lowest power to highest power. Then the $N^{th}$ biggest power is found, with N typically corresponding to about 75% of the samples. So, if a chirp has 256 samples, then the 75% level will be the $192^{nd}$ sample as ranked by power. The threshold used at step 306 may then be calculated by multiplying the power of the $192^{nd}$ ranked sample by a constant. The constant may be calculated previously and is set to balance sensitivity against false alarm probability. Hence, the method is generally similar to that described above, expect that the power threshold used at 306 is variable and is calculated on a chirp-by-chirp basis.

The intensity values for the chirps of the current radar cycle optionally may then be passed to MCU 140 at this stage and which may then determine what further actions to take or not. If the intensity value is zero and indicates the absence of interference in that chirp, then normal processing may be used for that chirp for each of the receiver channels. If the intensity value is moderate or high for a chirp, then interference mitigation and avoidance techniques may be applied. If the intensity value is severe then the data for the effected chirps may not be analyzed (owing to the heavy losses) and only avoidance techniques may be applied.

After a received chirp has been identified as interfered, processing proceeds to 320. A second thresholding procedure is then applied to the samples for an interfered received chirp to identify interfered samples and non-interfered samples. Depending on the implementation, the following steps may be applied to only moderately interfered, or moderately and highly interfered or moderately, highly and severely interfered received chirps.

Figure 11:
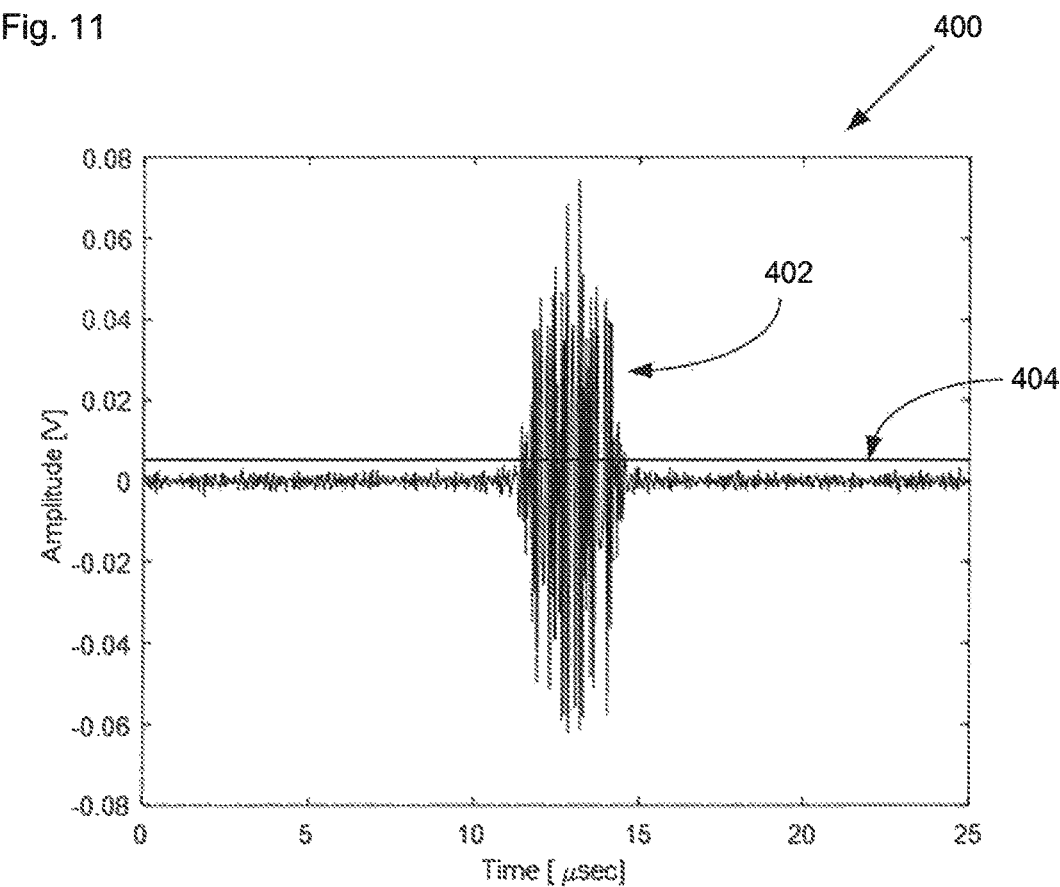
FIG. 11 shows a plot of sample amplitude against time for a chirp illustrating the presence of interference in the chirp and a sample threshold.

At 320, a first high pass filtered sample of the receiver signal for an interfered chirp is selected and at 322 the value for the first sample is compared to the same power threshold as used at 306. Again, the power threshold may be a fixed threshold or a variable threshold. FIG. 11 shows a plot 400 of sample amplitude against time 402 for all of the high pass filtered samples of the receiver signal for an interfered received chirp. The value of the power threshold is indicated by line 404.

If at 322 the value of the current high pass filtered sample is determined to be less than the further threshold, then a next sample of the current interfered chirp is selected at 324 and processing returns, as indicated by process flow line 326, and the next sample is compared to the further threshold at 322. Alternatively, if at 322 the value of the current sample is determined to exceed the further threshold, then at 328, the current sample is flagged as interfered and then a next sample of the current interfered chirp is selected at 324. A 1-d array WINDOW (FLAG) may be maintained for each interfered chirp including a field for each sample and where the value is set to zero for a non-interfered sample and the value is set to 1 for an interfered sample. Hence, the process repeats until all of the samples of the current interfered chirp have been evaluated against the threshold value 404.

Figure 12:
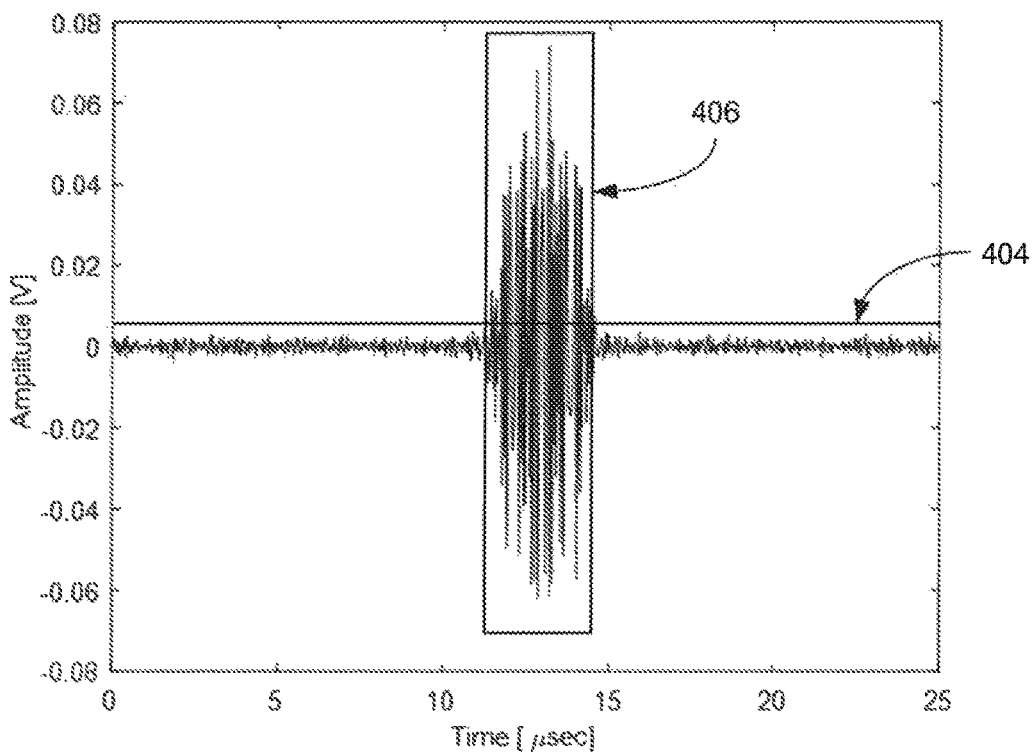
FIG. 12 shows the plot of sample amplitude against time for the chirp of FIG. 11 illustrating an extracted data window.

Then at 330, the sample flags are used to apply a window 406 (as illustrated in FIG. 12) to remove the interfered samples for the current chirp. The array WINDOW (FLAG) is applied to the samples of the current chirp and those samples having indices corresponding to indices at which WINDOW (FLAG) contains a 1 are set to zero. Hence, the interfered samples are removed from the current chirp (set to zero) and the non-interfered samples keep their previous values. Hence, the variable WINDOW (FLAG) contains the samples index per affected chirp of the interfered samples for the current interfered chirp.

Then at 332 it is determined if the receiver signals for all of the chirps of the current radar cycle have been processed and if not then processing return, as indicated by process flow line 334, and the receiver signals for a next transmitted chirp are selected at 308 and the receiver signals corresponding to the next transmitted chirp are evaluated similarly to determine if the received chirp is interfered, or not, and, if interfered, to identify those samples which are interfered and those which are not.

Hence, at the end of the process, a variable FLAG contains the chirp index of only the chirps that are affected by interference, a variable INTENSITY contains an indication of the degree of interference for chirps affected by interference, and the variable WINDOW (FLAG) contains the samples index per affected chirp of the interfered samples. As noted above these variables are calculated only using one receiver channel. This information is then passed to MCU at 336 so that it can be used to process the data for the other receiver channels of the radar system. This information is used to treat the received chirps and/or samples that are affected by interference. For example, received chirps with severe interference may simply not be processed. Received chirps with moderate or high interference may have the values of the interfered samples set to zero while the rest of the samples keep their original values, for example by using the data stored in the WINDOW (FLAG) variable. Received chirps with no interference may be processed as normal. The intention is to process those data while trying to push the noise floor back down to normal and which has been increased due to the presence of interference.

Figure 13:
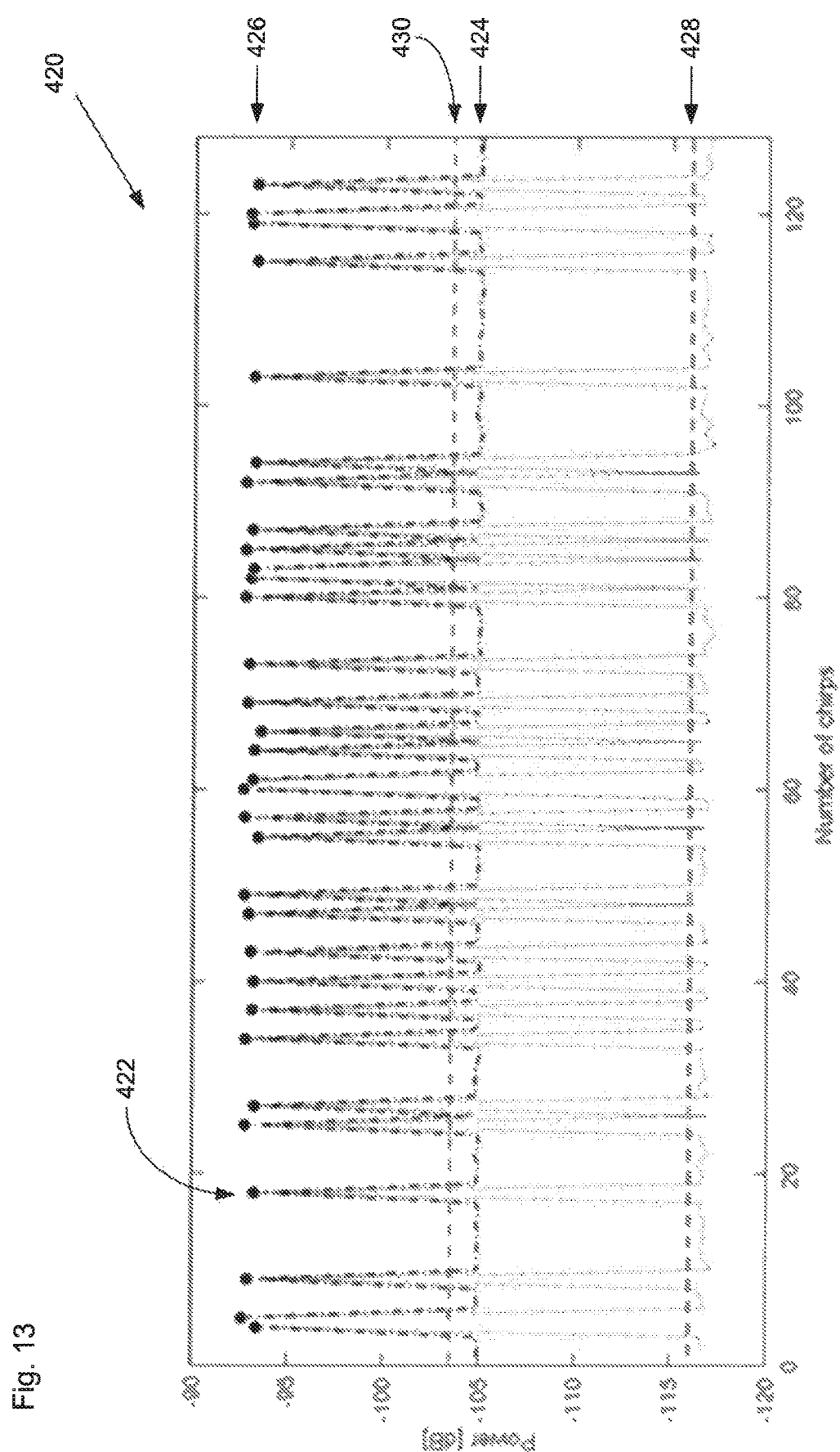
FIG. 13 shows a plot of chirp power level against chirp number for a sequence of chirps during a radar cycle in the presence of strong reflectors near the radar system.

The benefit of the using the high pass filtering can be seen in FIG. 13. FIG. 13 shows a plot of received signal power against chirp number for an entire radar cycle. FIG. 13 represents the power level of, for example, the 128 chirps in a radar cycle in the presence of strong reflectors near the radar system. The black dots, e.g. 422, represent the real interfered chirps. If the high pass filter is not used before calculating the power of a chirp, then the power calculation leads to an average value of −105 dB 424 (due to the presence of the targets) while the calculated power is around −93 dB 426 for the chirps affected by the interference 422. So, when a threshold is calculated only considering the system thermal noise (line 428 of FIG. 14 at about −116 dB), all the 128 chirps would be identified as interference. If also the power of signals reflected from targets is used to calculate the threshold then the threshold has to been set to a higher value (as indicated by line 430 at about −104 dB). This means that some residual interference can still be present in the signal after mitigation since the interference cannot properly be detected when there are also strong reflectors.

When the high pass filtering is applied before calculating the chirp power, then the power related to nearby strong reflectors (i.e. the low frequency components) is filtered out, and the system thermal noise threshold 428 can effectively be used to detect only the interference power.

Figure 14:
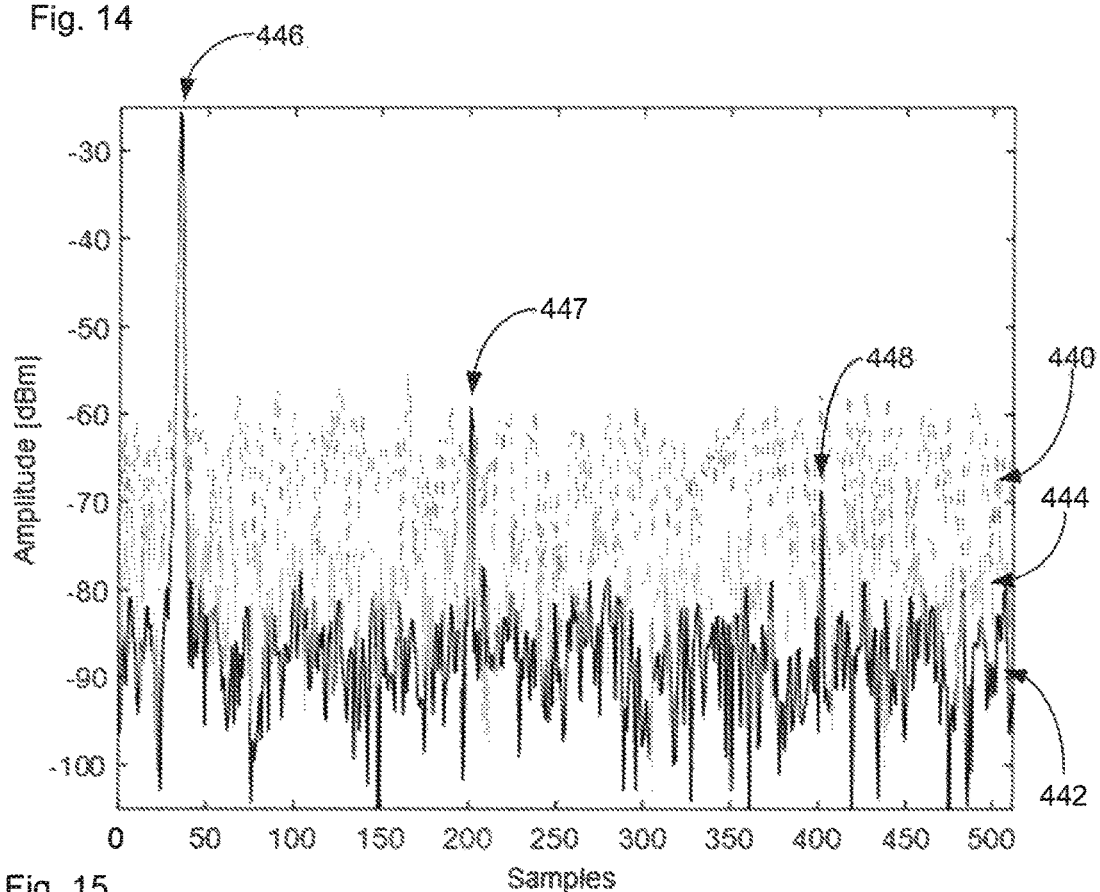
FIG. 14 shows a range profile including the interfered signal, the signal without interference and the signal after nulling without use of a high pass filter in the interference detection.
Figure 15:
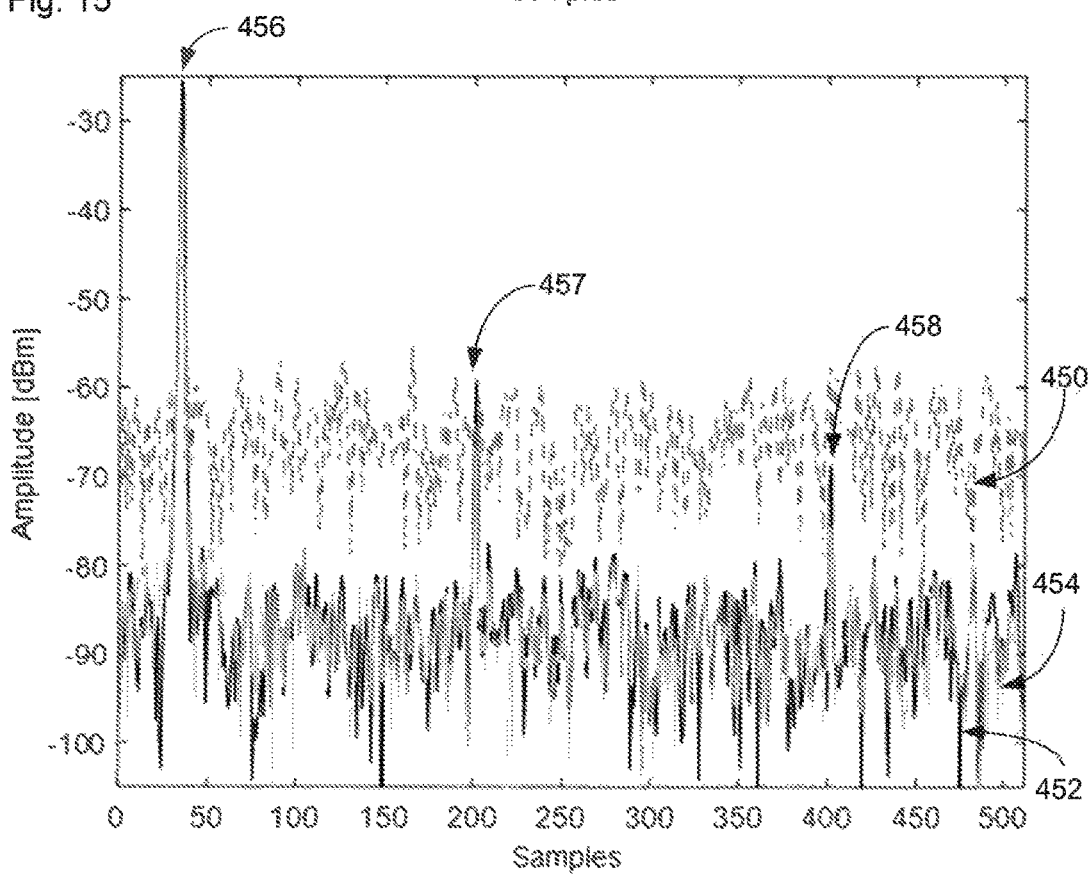
FIG. 15 shows a range profile similar to FIG. 14 including the interfered signal, the signal without interference and the signal after nulling with use of a high pass filter in the interference detection Similar items in the different Figures share like reference signs unless indicated otherwise.

FIGS. 14 and 15 also illustrate the benefit of the interference detection technique. FIG. 14 shows the range profile for three reflecting targets without the use of high pass filtering and with high pass filtering and FIG. 15 shows the range profile for three reflecting targets with the use of high pass filtering. In FIG. 14, for which high pass filtering is not used in the interference detection process, dashed line 440 shows the interfered signal, darker line 442 shows the signal in the absence of interference, and fainter line 444 shows the radar signal after trying to remove the effects of interference without using high pass filtering. The three peaks 446, 447, 448 in the darker line 442 correspond to three reflectors. Without the use of the high pass filter the third peak at least is lost in the fainter line 444 and hence the third reflector at least would not reliably be identified by the radar system.

In FIG. 15, for which high pass filtering is used in the interference detection process, dashed line 450 shows the interfered signal, darker line 452 shows the signal in the absence of interference, and fainter line 454 shows the radar signal after remove the effects of interference with using high pass filtering. The three peaks 456, 457, 458 in the darker line 442 correspond to three reflectors. With the use of the high pass filter all three peaks are still present in the fainter line 454 and hence the third reflector would reliably be identified by the radar system.

The high pass filtering based interference detection technique is especially suitable for short range radar (SRR) and ultra-short range radar (USRR) applications where the field of view and receiver bandwidth are bigger than in other applications and strong/close targets are the targets of interest.

Hence, a high pass filter may be applied before the $1^{st}$ stage of range processing in a radar system to reduce the contribution of the close and strong reflectors in the interference detection process. By applying this high pass filter, the return from close targets can be filtered out and only the interference can be effectively considered in the interference detection process. This allows the detection of interference with a lower power than the return from the close targets.

In this specification, example embodiments have been presented in terms of a selected set of details. However, a person of ordinary skill in the art would understand that many other example embodiments may be practiced which include a different selected set of these details. It is intended that the following claims cover all possible example embodiments.

Any instructions and/or flowchart steps can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

While the disclosure is amenable to various modifications and alternative forms, specifics thereof have been shown by way of example in the drawings and described in detail. It should be understood, however, that other embodiments, beyond the particular embodiments described, are possible as well. All modifications, equivalents, and alternative embodiments falling within the scope of the appended claims are covered as well.

What is claimed is:

1. A data processing device for detecting interference in frequency modulated continuous wave radar signals received by a radar receiver of a radar system, wherein the data processing device is configured to:
   apply a high pass filter to a receiver signal of a receiver channel of the radar receiver during an acquisition time corresponding to a transmitted chirp to remove those parts of the receiver signal corresponding to a reflected chirp having a power at the radar receiver greater than the noise power of the radar receiver of the radar system, wherein a cutoff frequency of the high pass filter is a function of a duration of the transmitted chirp, the noise power, and gain of the radar receiver;
   calculate the receiver signal power from the high pass filtered receiver signal; and
   compare the receiver signal power with a threshold noise power based on an estimate of the thermal noise of the radar receiver to determine whether the receiver signal corresponds to an interfered received chirp including interference or a non-interfered received chirp not including interference, for each of a plurality of transmitted chirps of the radar system.

2. The data processing device as claimed in claim 1, wherein the high pass filter is at least a second order high pass filter.

3. The data processing device as claimed in claim 1, wherein the cut off frequency of the high pass filter corresponds to a distance to a reflecting object beyond which a maximally reflecting object would have a received signal power at the radar receiver below the noise power of the radar receiver.

4. The data processing device as claimed in claim 1, wherein the data processing device is further configured to:
   determine the degree to which the receiver signal power exceeds the threshold noise power for each chirp; and
   store an intensity data item for each chirp indicating the degree of interference detected.

5. The data processing device as claimed in claim 4, wherein there are four categories of intensity data item and the categories correspond to no interference, moderate interference, high interference and severe interference.

6. The data processing device as claimed claim 1, wherein the threshold noise power is a fixed threshold noise power.

7. The data processing device as claimed in claim 1, wherein the threshold noise power is an adaptive threshold noise power.

8. The data processing device as claimed in claim 7, wherein the threshold noise power is calculated using a Constant False Alarm Rate technique.

9. The data processing device as claimed in claim 1, wherein the data processing device is further configured to:
identify interfered parts of the receiver signal identified as corresponding to an interfered received chirp.

10. The data processing device as claimed in claim 9, wherein the data processing device is further configured to identify interfered parts of the receiver signal by:
comparing samples of the receiver signal to a power threshold to identify interfered samples; and
storing a flag for each sample identified as an interfered sample.

11. The data processing device as claimed in claim 10, wherein the data processing device is further configured to:
pass the flags identifying interfered samples to a further part of the radar system for use to remove interfered samples from samples of the receiver signal corresponding to transmitted chirps in other receiver channels of the radar system.

12. The data processing device as claimed in claim 1, wherein the data processing device is further configured to:
pass data identifying each chirp determined to be an interfered received chirp to an avoidance and/or mitigation process within the radar system.

13. A package including an integrated circuit, wherein the integrated circuit is configured to provide the data processing device in claim 1.

14. A FMCW radar system including the data processing device of claim 1.

15. A method of detecting interference in an FMCW radar system, comprising, for each of a plurality of transmitted chirps:
high pass filtering a receiver signal in a receiver channel of a radar receiver during a data acquisition period corresponding to a transmitted chirp to filter out that part of the receiver signal corresponding to reflected chirps having a power at the radar receiver greater than the noise power of the radar receiver, wherein a cutoff frequency of the high pass filter is a function of a duration of the transmitted chirp, the noise power, and gain of the radar receiver;
calculating the receiver signal power of the high pass filtered receiver signal; and
comparing the receiver signal power to a threshold noise power based on an estimate of the thermal noise power of the radar receiver to determine whether the receiver signal corresponds to an interfered chirp including interference or a non-interfered chirp not including interference.

16. The method as claimed in claim 15, wherein the high pass filtering is at least a second order high pass filtering.

17. The method as claimed in claim 15, wherein cut off frequency of the high pass filtering corresponds to a distance to a reflecting object beyond which a maximally reflecting object would have a received signal power at the radar receiver below the noise power of the radar receiver.

18. The method as claimed in claim 15, further comprising:
determining the degree to which the receiver signal power exceeds the threshold noise power for each chirp; and
store an intensity data item for each chirp indicating the degree of interference detected.

19. The method as claimed in claim 18, wherein there are four categories of intensity data item and the categories correspond to no interference, moderate interference, high interference and severe interference.

20. The method as claimed claim 15, wherein the threshold noise power is a fixed threshold noise power.

* * * * *